May 24, 1927.  
H. ATHONS  
REAR SPRING CONSTRUCTION  
Filed April 13, 1925
1,629,672
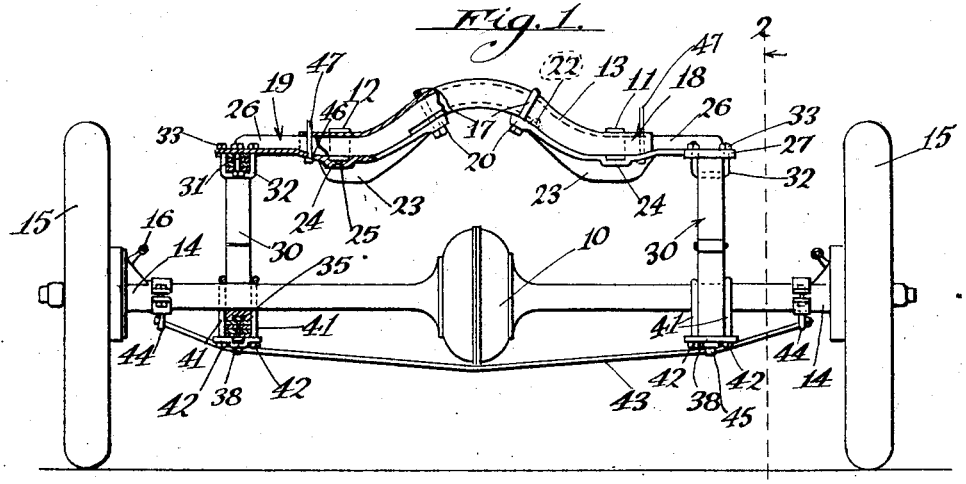
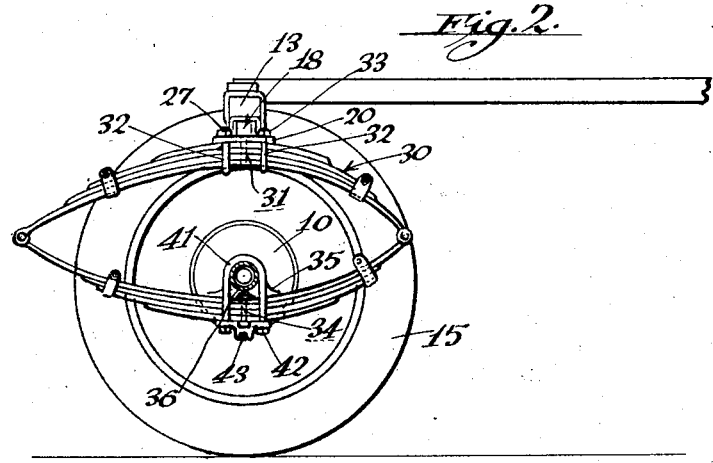
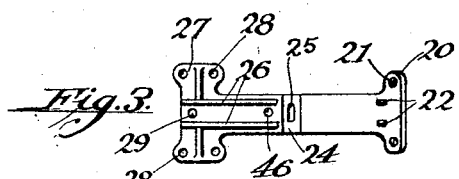
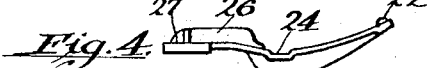
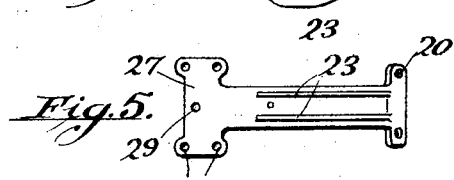
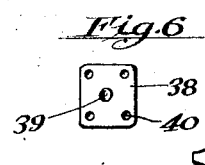
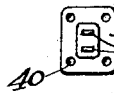
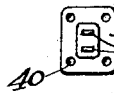
Inventor  
Herbert Athons  
By Hazard and Miller  
Attorneys Patented May 24, 1927.

1,629,672

UNITED STATES PATENT OFFICE.

HERBERT ATHONS, OF LOS ANGELES, CALIFORNIA.

REAR-SPRING CONSTRUCTION.

Application filed April 13, 1925. Serial No. 22,858.

This invention relates to improvements in rear spring constructions for vehicles. It is adapted to be used in conjunction with the forward spring construction for vehicles disclosed in my co-pending application Serial No. 22,859 filed April 13, 1925.

The primary object of this invention is to provide a rear spring construction which is designed to replace the rear spring construction upon a Ford automobile, so that owners of various Ford automobiles desiring to increase or better the riding qualities of their automobiles may have the improved spring construction easily and quickly applied without requiring additional bolt holes drilled in parts of the vehicle.

A further object of the invention is to provide an improved spring construction adapted to replace the single rear spring upon the Ford automobile by two full elliptic springs, and to associate certain parts with the full elliptic springs which are so constructed that they may easily and quickly be caused to accommodate themselves to the conventional parts on the Ford automobile.

With the foregoing and other objects in view which will be made manifest in the following detailed description and specifically pointed out in the appended claims, reference being had to the accompanying drawings for an illustrative embodiment of the invention, wherein:

Figure 1 illustrates the improved spring construction of my invention as applied to the rear of the frame and the rear axle housing upon a Ford automobile, Fig. 2 is a vertical section taken upon the line 2—2 in the direction indicated, Fig. 3 is a top plan view of one of the arms of my improved spring construction, Fig. 4 is a side elevation of the same, Fig. 5 is a bottom plan view of the arm, Figs. 6, 7 and 8 are a top plan view, a side elevation and a bottom plan view of the plate which constitutes one of the parts for fastening the springs to the rear axle housing, and Fig. 9 is a perspective view of another element constituting one of the parts for fastening the spring to the rear axle housing.

Referring to the accompanying drawings wherein similar reference characters designate similar parts throughout, the rear axle housing and the differential housing upon the conventional Ford automobile is indicated at 10. The frame of the vehicle has longitudinally extending side parts 11 and 12, which are in the form of channel irons. The rearward ends of these side parts are fastened to a transverse member 13. The construction upon the Ford automobile is such that the transverse member 13 is in the form of an inverted channel, and the ends of the side members 11 and 12 are secured to it adjacent its ends, but not quite at the ends of the transverse member. At the ends of the rear axle housing 10, members 14 are mounted to which the brake band is secured, which engages the drum which is mounted upon the wheels 15. Spring perches 16 are mounted upon the members 14. The present Ford rear spring construction consists of a semi-elliptic leaf spring which has its ends secured to the perches 16 as by shackles. The central portion of the leaf spring is disposed within the channel-shaped transverse member 13, and is secured therein as by U-bolts 17. In replacing the rear spring upon a Ford, the U-bolts 17 are unfastened and the shackles upon the ends of the spring are disconnected from the spring perches 16.

My improved spring construction consists of two arms 18 and 19 which are counterparts of each other, and which are shown in Figs. 3, 4 and 5. These arms have their inner ends extending beneath the channel-shaped transverse member 13 and at their adjacent ends they are widened, as indicated at 20, and are provided with bolt holes 21 which are capable of receiving the ends of the U-bolts 17 which previously fastened the old Ford spring within the channel-shaped transverse member 13. Suitable lugs 22 are formed upon the upper sides of the arms 18 and 19 near their adjacent ends and these lugs are so spaced as to extend upwardly between the sides of the channel 13 so as to prevent displacement of the arms. Reinforcing ribs 23 are formed upon the under side of that portion of each arm which is disposed beneath the transverse member 13. A suitable groove 24 is formed upon the upper side of each arm capable of receiving the lower side of the channel-shaped side part 11 or 12, as the case may be. A depression 25 is formed in the groove 24 so as to receive the head of the rivet or bolt fastening the transverse member 13 to the side part. The ends of the arms 18 and 19 project outwardly beyond the ends of the transverse member 13 and these projecting portions are flat on their under sides and on their upper sides are provided with reinforcing ribs 26. These reinforcing ribs are so spaced that their inner ends are capable of being received between the side portions of the channel forming the transverse member 13 at the ends of the transverse member. In this manner the reinforcing ribs 26 prevent lateral displacement of the arm. The outer end of each arm is flattened, as at 27, and four bolt holes 28 are formed therein. A central bolt hole 29 is also formed in the flattened portion 27 of each arm.

Full elliptic springs 30 which are of conventional construction have their upper leaves disposed against the under side of the flattened portions 27 of each of the arms. A bolt 31 secures the leaves of the spring together and extends through the bolt hole 29 in the flattened portion 27 to prevent longitudinal shifting of the springs beneath the arms. Two U-bolts 32 extend beneath the upper leaves of the springs 30 and have their upper ends extending through the bolt holes 28. They are fastened in place by nuts 33. The lower leaves of the full elliptic springs 30 are fastened together as by a bolt 34. A spacer member 35 has a groove 36 formed on its top, which groove is capable of receiving the rear axle housing 10, so as to fit snugly thereagainst. A recess 37 is formed along the under side of the spacer member 35 to receive the upper end of the bolt 34. A plate 38 shown in Figs. 6, 7 and 8 is positioned upon the underside of the lower leaves of each spring. This plate on its top surface is formed with a recess or depression 39 which receives the nut of the bolt 34, and the plate is also provided with four bolt holes 40. U-bolts 41 extend over the rear axle housing 10 downwardly along the sides of the leaves forming the lower half of each spring and through the bolt holes 40, being fastened to the plate 38 by nuts 42. It will be understood that the bolts 31 and 34 prevent longitudinal slipping of the full elliptic springs 30.

By reason of the fact that the weight of the vehicle is not transmitted through the springs to the end of the axle as was previously done upon the Ford automobile, I find it advantageous to employ a truss rod 43. Collars 44 are clamped about the members 14 and the ends of the truss rod 43 are fastened to these collars. The truss rod 43 extends beneath the differential housing and the plates 38. Suitable lugs 45 are formed upon the under side of each plate 38, between which the truss rod 43 extends.

From the above it will be appreciated that an improved rear spring construction is provided for vehicles which is especially adapted to replace the rear spring upon the Ford automobile. I replace the single semi-elliptic spring by two full elliptic springs, which greatly increases the riding qualities of the Ford automobile. The arms 18 and 19 are so constructed as to be easily and quickly applied to the transverse channel 13, and it is unnecessary to bore any holes in the Ford construction. The arms 18 and 19 are so formed as to have portions fitting within the channel 13 to prevent slipping and the old U-bolts 17 already provided upon the automobile are used when my improved spring construction is applied. It will be noted from an inspection of Fig. 2 that the forward end of the full elliptic spring 30 is nearer the rear axle housing 10 than the rearward end of the spring. This is because of the radius rod extending from the members 14 toward each other and toward the forward end of the vehicle. Because of the size of the springs that I employ, this shifting of the full elliptic springs rearwardly past their centers is necessary so that the forward end of each spring will not engage the radius rod. Furthermore, it will be noted that a bolt hole 46 is formed in each arm capable of receiving the body bolts 47, if desired.

It will be understood that various changes may be made in the detail of construction without departing from the spirit or scope of the invention as defined by the appended claims.

I claim:

1. In a vehicle wherein there is a rear transverse inverted channel shaped member and a rear axle housing, a rear spring construction comprising two arms mounted upon the ends of the transverse member, said arms having their ends projecting beyond the ends of the transverse member, ribs formed upon the top surfaces of the arms adjacent their outer ends which bear against the sides of the transverse member, said arms bearing against the underside of said transverse member and being widened adjacent their inner ends, U-boats arranged across the transverse member having their ends extending through the widened inner ends of the arms and secured thereto, full elliptic springs arranged between the outer ends of the arms and the axle housing, means for securing the upper leaves of each spring intermediate their ends to the outer end of their respective arm and means for securing the lower leaves of each spring intermediate their ends to the axle housing.

2. In a vehicle wherein there is a rear transverse inverted channel shaped member and a rear axle housing, a rear spring construction comprising two arms mounted upon the ends of the transverse member, said arms having their ends projecting beyond the ends of the transverse member, ribs formed upon the top surfaces of the arms adjacent their outer ends which bear against the sides of the transverse member, said arms bearing against the under side of said transverse member and being widened adjacent their inner ends, U-bolts arranged across the transverse member having their ends extending through the widened inner ends of the arms and secured thereto, full elliptic springs arranged between the outer ends of the arms and the axle housing, U-bolts extending through the outer ends of the arms and serving to secure the upper leaves of the springs intermediate their ends to the arms, the lower leaves being arranged beneath the axle housing, blocks fitting against the under side of the axle housing and against which the lower leaves bear and U-bolts arranged over the axle housing and plates fastened by the U-bolts against the under side of the leaves.

3. In a vehicle wherein there is a rear transverse inverted channel shaped member and a rear axle housing, a rear spring construction comprising two arms mounted upon the ends of the transverse member, said arms having their ends projecting beyond the ends of the transverse member, ribs formed upon the top surfaces of the arms adjacent their outer ends which bear against the sides of the transverse member, said arms bearing against the under side of said transverse member and being widened adjacent their inner ends, U-bolts arranged across the transverse member having their ends extending through the widened inner ends of the arms and secured thereto, full elliptic springs arranged between the outer ends of the arms and the axle housing, U-bolts extending through the outer ends of the arms and serving to secure the upper leaves of the springs intermediate their ends to the arms, blocks fitting against the axle housing against which the lower leaves bear, plates positioned against the leaves and U-bolts for tightening the plates against the leaves, thus securing the lower leaves of each spring to the axle housing.

In testimony whereof I have signed my name to this specification.

HERBERT ATHONS.